United States Patent
Lee et al.

(10) Patent No.: US 10,657,250 B2
(45) Date of Patent: May 19, 2020

(54) METHOD AND APPARATUS FOR DETECTING ANOMALY BASED ON BEHAVIOR-ANALYSIS

(71) Applicant: SAMSUNG SDS CO., LTD., Seoul (KR)

(72) Inventors: Eun Hye Lee, Seoul (KR); Kyu Sam Oh, Seoul (KR); Min Jae Kim, Seoul (KR); Kwang Hun Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 263 days.

(21) Appl. No.: 15/791,852

(22) Filed: Oct. 24, 2017

(65) Prior Publication Data

US 2018/0114016 A1  Apr. 26, 2018

(30) Foreign Application Priority Data

Oct. 24, 2016 (KR) .................. 10-2016-0138512

(51) Int. Cl.
  *G06F 21/00* (2013.01)
  *G06F 21/55* (2013.01)
(52) U.S. Cl.
  CPC .................. *G06F 21/552* (2013.01)
(58) Field of Classification Search
  CPC ...... G06F 21/552; G06F 21/50; H04W 12/12; H04L 63/1425; H04L 63/1416; H04L 63/20; H04L 63/10; H04L 63/1433
  See application file for complete search history.

(56) References Cited

U.S. PATENT DOCUMENTS

| | | | |
|---|---|---|---|
| 9,904,587 B1* | 2/2018 | Potlapally | G06F 11/079 |
| 2008/0059474 A1* | 3/2008 | Lim | G06F 21/604 |

(Continued)

FOREIGN PATENT DOCUMENTS

| | | |
|---|---|---|
| KR | 10-0980117 B1 | 9/2010 |
| KR | 10-1256507 B1 | 4/2013 |
| KR | 10-1501669 B1 | 3/2015 |

OTHER PUBLICATIONS web.archive.org/web/20150914182458/https://en.wikipedia.org/wiki/K-means_clustering (Year: 2015).*

*Primary Examiner* — Joseph P Hirl
*Assistant Examiner* — Ka Shan Choy
(74) *Attorney, Agent, or Firm* — Sughrue Mion, PLLC

(57) ABSTRACT

Provided are a method for detecting an anomaly based on behavior-analysis. The method comprises creating, by an apparatus for detecting an anomalous behavior of a user, K clusters, each cluster of the K clusters being created based on past behavior counters associated with one or more users, designating, by the apparatus, a cluster pattern of the each cluster of the K clusters, the cluster pattern indicating a representative behavior of the past behavior counters belonging to the each cluster, determining, by the apparatus, a past behavior pattern of a first user based on a first past behavior counters associated with the first user and the each cluster of the K clusters, obtaining, by the apparatus, a first current behavior counters associated with the first user based on monitoring information from an agent software program, the agent software program being installed on a computing device of the first user and monitoring behaviors associated with the first user, determining, by the apparatus, a current behavior pattern of the first user based on the first current behavior counters and the each cluster of the K clusters and detecting, by the apparatus, the anomalous behavior of the (Continued)

first user by comparing the past behavior pattern and the current behavior pattern of the first user.

17 Claims, 14 Drawing Sheets

(56) References Cited

U.S. PATENT DOCUMENTS

2009/0293121 A1* 11/2009 Bigus ................... G06F 21/316
  726/22
2016/0127367 A1* 5/2016 Jevans ................ H04L 63/1433
  713/152
2018/0101765 A1* 4/2018 Chiang ................ G06N 3/0454

* cited by examiner

| DATE | DATE | OPEN | COPY | ATTACH | PRINT | ... | MOVE |
|---|---|---|---|---|---|---|---|
| 20160501 | User1 | 27 | 3 | 2 | 0 | ... | 4 |
| 20160502 | User1 | 18 | 1 | 1 | 0 | ... | 0 |
| 20160503 | User1 | 20 | 7 | 0 | 0 | ... | 0 |
| 20160504 | User1 | 40 | 8 | 1 | 0 | ... | 0 |
| ... | User1 | ... | ... | ... | ... | ... | ... |
| 20160514 | User1 | 20 | 0 | | | ... | 3 |
| 20160515 | User1 | 30 | 10 | 6 | 2 | ... | 3 |

DATA AVERAGE FROM MAY 01 TO 14, 2016

| USER | OPEN | COPY | ATTACH | PRINT | ... | MOVE |
|---|---|---|---|---|---|---|
| User1 | 12.111 | 3.111 | 1.000 | 0.000 | ... | 3.003 |

DATA ON MAY 15, 2016

| USER | OPEN | COPY | ATTACH | PRINT | ... | MOVE |
|---|---|---|---|---|---|---|
| User1 | 30 | 10 | 6 | 2 | ... | 3 |

$$\frac{x_{useri} - mean_{act}}{\sqrt{\sum_{user1}^{userN}(x_{useri} - mean_{act})^2}}$$

useri: user1 ~ userN
$x_{useri}$ : BEHAVIOR COUNT FOR EACH USER
$mean_{act}$ : AVERAGE COUNT FOR EACH BEHAVIOR

FIG. 5B

| USER | OPEN | COPY | ATTACH | PRINT | ... | MOVE |
|---|---|---|---|---|---|---|
| User1 | 12.111 | 3.111 | 1.002 | 0.000 | ... | 3.003 |
| User2 | 41.010 | 5.013 | 3.202 | 3.004 | ... | 0.001 |
| ... | ... | ... | ... | ... | ... | ... |
| UserN | 10.003 | 1.083 | 4.073 | 0.002 | ... | 0.002 |

⇩ normalization

| USER | OPEN | COPY | ATTACH | PRINT | ... | MOVE |
|---|---|---|---|---|---|---|
| User1 | 0.027 | 0.008 | 0.004 | 0.011 | ... | 0.090 |
| User2 | 0.050 | 0.013 | 0.007 | 0.034 | ... | 0.001 |
| ... | ... | ... | ... | ... | ... | ... |
| UserN | 0.023 | 0.003 | 0.013 | 0.017 | ... | 0.002 |

FIG. 5C

| USER | OPEN | COPY | ATTACH | PRINT | ... | MOVE |
|---|---|---|---|---|---|---|
| User1 | 30 | 10 | 6 | 2 | ... | 3 |
| User2 | 10 | 13 | 3 | 4 | ... | 1 |
| ... | ... | ... | ... | ... | ... | ... |
| UserN | 4 | 3 | 7 | 7 | ... | 2 |

⇩ normalization

| USER | OPEN | COPY | ATTACH | PRINT | ... | MOVE |
|---|---|---|---|---|---|---|
| User1 | 0.013 | 0.002 | 0.071 | 0.004 | ... | 0.011 |
| User2 | 0.002 | 0.007 | 0.033 | 0.147 | ... | 0.007 |
| ... | ... | ... | ... | ... | ... | ... |
| UserN | 0.001 | 0.001 | 0.080 | 0.204 | ... | 0.009 |

| USER | OPEN | COPY | ATTACH | PRINT | ... | MOVE |
|---|---|---|---|---|---|---|
| User1 | 0.027 | 0.008 | 0.004 | 0.011 | ... | 0.000 |
| User2 | 0.010 | 0.013 | 0.002 | 0.004 | ... | 0.001 |
| User3 | 0.002 | 0.001 | 0.001 | 0.004 | ... | 0.011 |
| User4 | 0.013 | 0.007 | 0.033 | 0.147 | ... | 0.027 |
| ... | ... | ... | ... | ... | ... | ... |
| UserN | 0.003 | 0.083 | 0.083 | 0.007 | ... | 0.002 |

FIG. 7B

| CLUSTER | OPEN | COPY | ATTACH | PRINT | ... | MOVE | PATTERN |
|---|---|---|---|---|---|---|---|
| A-1 | 0.80 | 0.10 | 0.00 | 0.10 | ... | 0.20 | OPEN |
| A-2 | 0.01 | 0.01 | 0.10 | 0.10 | ... | 0.20 | ATTACH, PRINT, MOVE |
| A-3 | 0.00 | 0.01 | 0.01 | 0.00 | ... | 0.00 | - |
| ... | ... | ... | ... | ... | ... | ... | ... |
| A-K | 0.10 | 0.01 | 0.10 | 0.09 | ... | 0.00 | OPEN, ATTACH |

FIG. 7C

| CLUSTER | OPEN | COPY | ATTACH | PRINT | ... | MOVE | PATTERN |
|---|---|---|---|---|---|---|---|
| C-1 | 0.80 | 0.10 | 0.90 | 0.80 | ... | 0.20 | ATTACH, PRINT |
| ... | ... | ... | ... | ... | ... | ... | ... |
| C-L | 0.10 | 0.80 | 0.80 | 0.09 | ... | 0.80 | COPY, ATTACH, MOVE |

FIG. 7D

| CLUSTER | OPEN | COPY | ATTACH | PRINT | ... | MOVE | PATTERN |
|---|---|---|---|---|---|---|---|
| A-1 | 0.80 | 0.10 | 0.00 | 0.10 | ... | 0.20 | OPEN |
| A-2 | 0.01 | 0.01 | 0.10 | 0.10 | ... | 0.20 | ATTACH, PRINT, MOVE |
| A-3 | 0.00 | 0.01 | 0.01 | 0.00 | ... | 0.00 | - |
| ... | ... | ... | ... | ... | ... | ... | ... |
| A-K | 0.10 | 0.01 | 0.10 | 0.09 | ... | 0.00 | OPEN, ATTACH |
| C-1 | 0.80 | 0.10 | 0.90 | 0.80 | ... | 0.20 | ATTACH, PRINT |
| ... | ... | ... | ... | ... | ... | ... | ... |
| C-L | 0.10 | 0.80 | 0.80 | 0.09 | ... | 0.80 | COPY, ATTACH, MOVE |

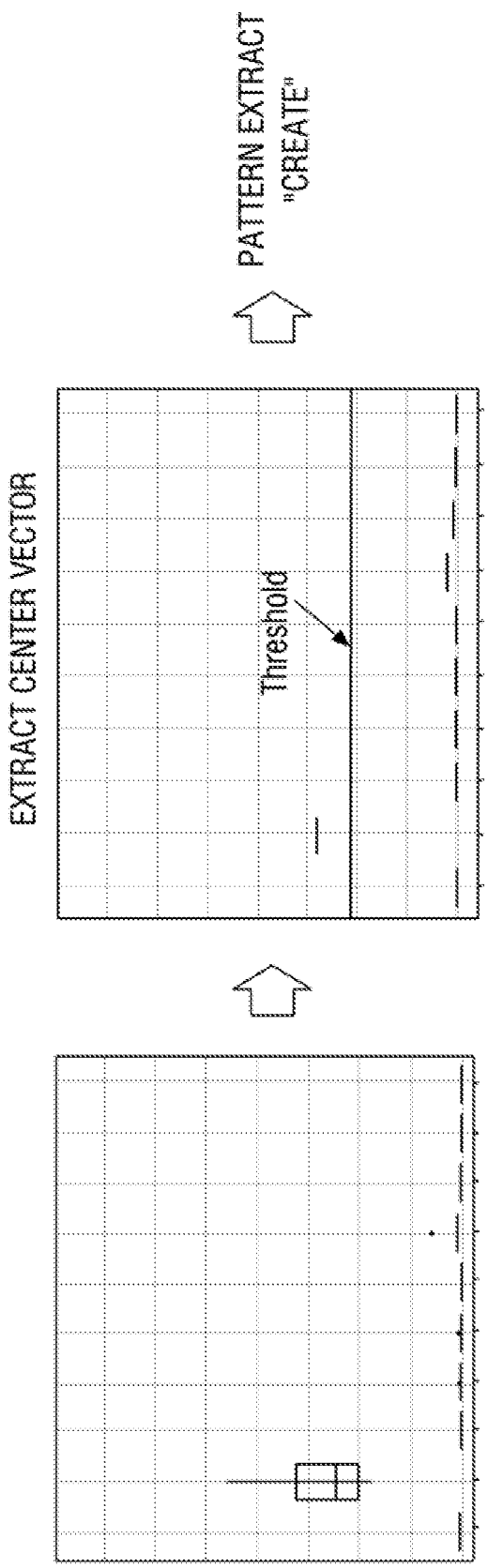

METHOD AND APPARATUS FOR DETECTING ANOMALY BASED ON BEHAVIOR-ANALYSIS

This application claims priority from Korean Patent Application No. 10-2016-0138512 filed on Oct. 24, 2016 in the Korean Intellectual Property Office, the disclosure of which is incorporated herein by reference in its entirety.

BACKGROUND

1. Field of the Disclosure

The present disclosure relates to a method and an apparatus for detecting an anomaly based on behavior-analysis. More specifically, the present disclosure relates to a method for detecting internal information leakage in a company or the like by monitoring users' behaviors of using documents to detect a behavior in a pattern different from the past pattern of the behavior, and an apparatus perform the method.

2. Description of the Related Art

"Another attempt to leak the core semiconductor technology of Company A. How did he break through the thorough security system?", which is an excerpt from the headline of a news article on Sep. 25, 2016. The article says that the executive with the surname Lee, who was in charge of quality control at Company A, was caught by security attempting to leave the company compounds with 14 copied documents that covered technology data on the nano processing An additional security solution is installed in the mobile device of every executives of Company A. Accordingly, as they pass through the security devices at the office, the features of taking pictures, Bluetooth and Wi-Fi are automatically turned off. In addition, an electronic detector and an X-ray scanner are installed in the security devices, so no one can carry out a USB or external hard disk with permission.

According to the article, the executive seems to have carried out the confidential data little by little in the form of documents. Actually, thousands of documents were found at his home after searching by Company A. This attempt was based on the idea that electronic devices such as smart phones and storage devices are mainly monitored at the security devices, which is a security hole.

It is believed that by patterning the executive's ordinary behavior and monitoring it, it was possible to detect the increased number of behavior of "printing" documents by him as an anomaly, to thereby prevent his technology leak in the form of documents.

Therefore, what is required is a method for monitoring a behavior of leaking internal information in a company or the like by analyzing users' behavior/activities of using files, so as to detect the behavior of leaking.

SUMMARY

It is an object of the present disclosure to provide a method and apparatus for detecting a change in behaviors in advance by monitoring behaviors of using documents for each user. By doing so, it is possible to detect a change in behavior considered as risking security, such as internal information leakage, and to respond to it quickly.

This and other aspects, embodiments and advantages of the present disclosure will become immediately apparent to those of ordinary skill in the art upon review of the Detailed Description and Claims to follow.

According to an exemplary embodiment of the present disclosure, there is provided a method for detecting an anomaly based on behavior-analysis. The method comprises creating, by an apparatus for detecting an anomalous behavior of a user, K clusters, each cluster of the K clusters being created based on past behavior counters associated with one or more users, designating, by the apparatus, a cluster pattern of the each cluster of the K clusters, the cluster pattern indicating a representative behavior of the past behavior counters belonging to the each cluster, determining, by the apparatus, a past behavior pattern of a first user based on a first past behavior counters associated with the first user and the each cluster of the K clusters, obtaining, by the apparatus, a first current behavior counters associated with the first user based on monitoring information from an agent software program, the agent software program being installed on a computing device of the first user and monitoring behaviors associated with the first user, determining, by the apparatus, a current behavior pattern of the first user based on the first current behavior counters and the each cluster of the K clusters and detecting, by the apparatus, the anomalous behavior of the first user by comparing the past behavior pattern and the current behavior pattern of the first user.

According to another exemplary embodiment of the present disclosure, there is provided an apparatus for detecting an anomalous behavior of a user based on behavior-analysis. The apparatus comprises at least one processor, a network interface, a memory configured to load a computer program and storage configured to store the computer program which, when executed by the at least one processor, causes the at least one processor to perform operations comprising creating K clusters, each cluster of the K clusters being created based on past behavior counters associated with one or more users, designating a cluster pattern of the each cluster of the K clusters, the cluster pattern indicating a representative behavior of the past behavior counters belonging to the each cluster, determining a past behavior pattern of a first user based on a first past behavior counter associated with the first user and the each cluster of the K clusters, obtaining a first current behavior counters associated with the first user based on monitoring information from an agent software program installed on a computing device of the first user, determining a current behavior pattern of the first user based on the first current behavior counters and the each cluster of the K clusters and detecting the anomalous behavior of the first user by comparing the past behavior pattern and the current behavior pattern of the first user.

According to an exemplary embodiment of the present disclosure, there is provided a computer-readable storage medium storing instructions which, when executed by a processor, cause the processor to perform operations comprising creating K clusters, each cluster of the K clusters being created based on past behavior counters associated with one or more users, designating a cluster pattern of the each cluster of the K clusters, the cluster pattern indicating a representative behavior of the past behavior counters belonging to the each cluster, determining a past behavior pattern of a first user based on a first past behavior counter associated with the first user and the each cluster of the K clusters, obtaining a first current behavior counters associated with the first user based on monitoring information from an agent software program installed on a computing device of the first user, determining a current behavior pattern of the first user based on the first current behavior counters associated with the first user and the each cluster of the K clusters and detecting an anomalous behavior of the first user by comparing the past behavior pattern and the current behavior pattern of the first user.

The following effects can be achieved according to exemplary embodiments of the present disclosure:

Previously, it was monitored if the insiders transmit e-mails to the outside or to themselves. Or, it was monitored if an e-mail contains specific keywords or specific attachment. However, such e-mail filtering alone was not sufficient to detect information leakage. That is, it was not possible to monitor if a malicious individual leaks the information via other means than e-mails, such as printing documents and carrying them out without permission. In contrast, according to exemplary embodiments of the present disclosure, it is possible to monitor if a user leaks information based on the users' behavior of using documents. In this manner, if a malicious individual such as an insider or a work who is quitting the company soon attempts to take documents out, it is possible to take appropriate measures in advance.

In the existing information leakage detection method, there is a problem in that learning requires a sufficient number of information leakage incidents that have been detected in the past, and if not, learning data is not appropriate and it is not possible to detect information leak which is of a different type from that is learnt. In other words, it was very difficult to model the information leak incidents by supervised learning because the incidents occur very rarely. That is, anomaly patterns were too rare to identify one and detect it as an anomaly. In view of the above, according to exemplary embodiments of the present disclosure, a change in the behavior of using files is detected by unsupervised learning, and it is monitored if a user leaks information by using it, which is easy and effective to use.

In addition, previously, there was a threshold value for user's particular behavior set based on rules, such that it was determined that there is an anomaly if it exceeds the threshold value. However, there is a disadvantage that it is not easy to set an appropriate threshold value. For example, if the threshold value is set too small, excessive false alarms may occur. If the threshold value is set too high, an anomaly may not be correctly detected. In contrast, according to exemplary embodiments of the present disclosure, it is possible to detect abnormality if a usage pattern is different from a past usage pattern without the need to set a separate threshold or rule.

Besides, previously, an additional agent program had to be installed in order to collect users' behavior of using their computers (PCs). However, this uses a part of the limited PC resources, and thus has a problem of imposing a heavy load on the user's PCs of a company having already installed a large number of agents (PC security, DRM, anti-virus, personal information protection solution, etc.). In contrast, according to exemplary embodiments of the present disclosure, it is not necessary to install an additional agent program in order to collect information on the behavior of using documents because agents that have already been established in most companies are used. Accordingly, the resources of the personal computer can be used more efficiently, and there is no need to invest for an additional server or storage space.

It should be noted that effects of the present disclosure are not limited to the above-described effects, and other effects of the present disclosure will be apparent to those of ordinary skill in the art from the following descriptions.

BRIEF DESCRIPTION OF THE DRAWINGS

The above and other aspects and features of the present disclosure will become more apparent by describing in detail exemplary embodiments thereof with reference to the attached drawings, in which:

FIG. 3 is a diagram illustrating a process of collecting data that may be used in some exemplary embodiments of the present disclosure;

FIG. 4 is a flowchart for illustrating a data preprocessing step according to an exemplary embodiment of the present disclosure;

FIGS. 5A to 5C are diagrams illustrating a data preprocessing step according to an exemplary embodiment of the present disclosure;

FIG. 6 is a flowchart for illustrating a process of creating patterns according to an exemplary embodiment of the present disclosure;

FIGS. 7A to 7D are diagrams for illustrating a process of creating patterns of clusters according to an exemplary embodiment of the present disclosure;

FIGS. 10A to 10C are diagrams for illustrating a process of determining the number of clusters according to an exemplary embodiment of the present disclosure;

DETAILED DESCRIPTION OF THE EMBODIMENTS

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, exemplary embodiments of the present disclosure will be described in detail with reference to the accompanying drawings.

Figure 1:
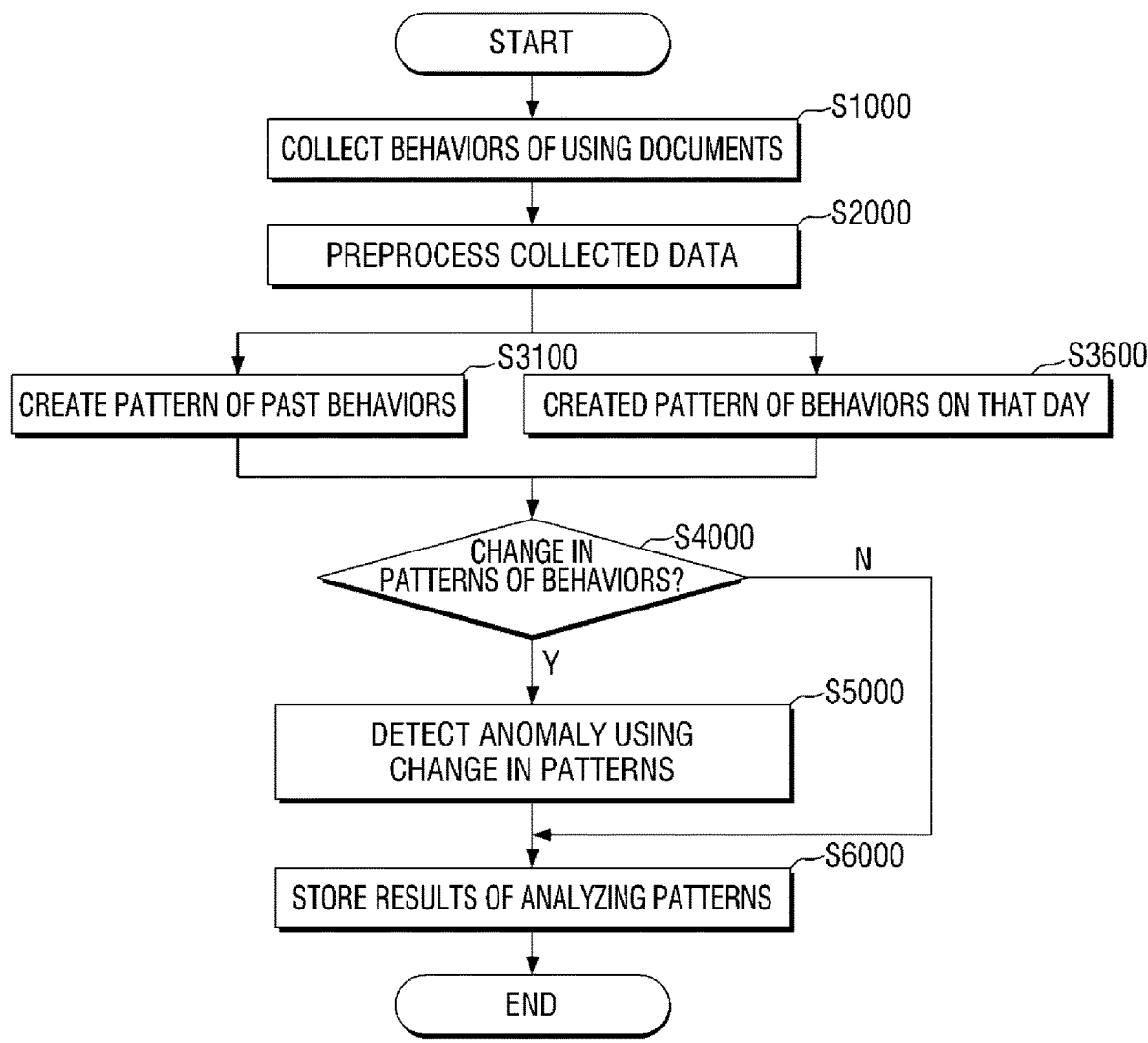
FIG. 1 is a flowchart for illustrating a method for detecting an anomaly based on behavior-analysis according to an exemplary embodiment of the present disclosure.

FIG. 1 is a flowchart for illustrating a method for detecting an anomaly based on behavior-analysis according to an exemplary embodiment of the present disclosure. Hereinafter, the anomaly may represent anomalous behavior of a user and the anomalous behavior may represent a behavior that deviates from a reference behavior pattern.

Referring to FIG. 1, the method according to according to the exemplary embodiment of the present disclosure includes automatically creating a pattern (profiling) based on a user's behavior of using documents and analyzing a change in the pattern over time. By doing so, the method according to the exemplary embodiment of the present disclosure is characterized in that a significant change in the user's behavior is filtered. The significant change in the behavior may be defined in many ways. For example, a behavior suspected as leaking internal information may be a significant change in the behavior.

Previously, a rule or a scenario was set up based on experts or previous leak incidents to identify a behavior of leaking internal information. Or, the probability was calculated by Bayesian network or the like, and if the probability value exceeded the threshold, it was determined that there is a behavior of leaking internal information.

However, according to the existing methods, it is determined whether there is an anomaly based on the rules or scenarios initially set, and such criterion does not change. As a result, it is not possible to identify the behavior of leaking internal information that is advanced and intelligent over time. In addition, if it is necessary to update the rule or scenario, a lot of efforts and resources are required to update the rule or scenario comparable to those at the initial setting. Also, when the probability value is used, since the probability value is calculated based on the existing cases, it is difficult to quickly respond to the newly emerging behavior of leaking internal information.

In addition, according to the existing methods, if the threshold value is set high in the process of establishing the criterion, it may fail to detect a significant result during the process of determination. If the threshold value is set low, there may be too many false positives or false negatives. As a result, too many alarms are given to the administrator in actual use, and the administrator does not have a sufficient time to perform the verification procedure for all the determinations. Consequently, the administrator cannot trust the system and eventually does not use the system at all.

In addition, in the existing methods, internal information leakage cases are required to set up criterion. However, such cases are very rare, so it was very difficult to collect the cases. Accordingly, a very old case may be used which is far from the circumferences of establishing the system for detecting internal information leakage. When the system for detecting internal information leakage is established with such old or very rare data, the system is overfitted to a specific case, and loses generality of the system. In addition, if a past behavior of the internal information leakage is included in the data to be analyzed to set the threshold value, the threshold value is set by reflecting the past behavior. As a result, if a behavior of internal information leakage occurs later, it is determined as an ordinary behavior.

In order to solve these problems of the prior art, according to the exemplary embodiments of the present disclosure, it is determined whether a user's current behavior of using documents has been changed based on the user's past behavior of using documents, instead of detecting an anomaly based on a certain criterion. That is, it can be said that the existing methods use the machine learning based on the supervised learning, it can be said that the method according to the exemplary embodiment of the present disclosure use the machine learning based on the unsupervised learning. In other words, according to the exemplary embodiments of the present disclosure, neither a threshold nor a very rate internal information leakage case is required. Since no threshold value is required, it is possible to overcome the issues of the above-described inappropriate threshold value.

Referring to FIG. 1, the method according to the exemplary embodiment of the present disclosure includes collecting a user's behavior of using documents (step S1000). A plurality of users' behaviors of using documents are collected and are used as training data. The collection of data will be described in detail with reference to FIGS. 2 and 3.

The collected behavior of using documents are subjected to a preprocessing step (step S2000). The preprocessing step is a process for adjusting the numerical values of behavior of using documents. For example, the behavior of using documents may include a variety of behavior such as [open], [create], [attach], [edit], [delete], [move], [copy], [print], [save] and [change permissions]. In the following description, the user's behavior will be expressed within the brackets.

There are some problems if the numerical values counted from such behavior are directly used. In most cases, the behavior [open] will be mostly frequently used, and behavior such as [print] or [copy] will be relatively less used. Even though the behavior [open] is relatively frequently used, behavior such as [copy], [print], [move] and [change permissions] are threatening behavior associated with leaking internal information. Therefore, it is necessary to rescale the collected data in order to easily detect such behavior. The preprocessing step may use standardization, normalization and so on. The preprocessing step will be described with reference to FIGS. 4 to 5C.

After the preprocessing step, a pattern is created with the behavior of using documents (step S3100). The pattern may be created by clustering the plurality of users' behaviors. Most users perform repetitive tasks, and accordingly the behavior of using documents also have a pattern of repetitive behavior. By creating patterns, the type of users can be divided into a user who frequently performs the opening of documents only, a user who frequently performs the printing of documents, and a user who frequency performs the editing of documents.

In addition to creating patterns of a user's past behaviors of using documents, a pattern of the user's behavior of using documents on a particular day is also created (step S3600). If the pattern of the user's past behavior is the same as the pattern of the user's behavior on the day, this means that there is no problem. If not, there may be a problem.

In order to determine this, the pattern of past behavior is compared with the pattern of behavior on the day (step S4000). If there is a change between the patterns, it is detected as an anomaly, and an appropriate action may be taken (step S5000). If the patterns have not been changed, the results of analyzing the patterns is stored (step S6000), and it may be used again in detecting an anomaly later. The process of patterning or determining an anomaly will be described in more detail with reference to FIGS. 6 to 12.

The flowchart for illustrating the method for detecting an anomaly based on behavior-analysis according to e exemplary embodiment of the present disclosure has been described above with reference to FIG. 1. By using the stored patterns according to the exemplary embodiment of the present disclosure, additional analysis is also possible. That is, beyond simply detecting a change between the patterns in the past and the patterns on the day, it is possible to generate a time-series profile using the stored patterns, thereby performing pattern change and time-series analysis.

Figure 2:
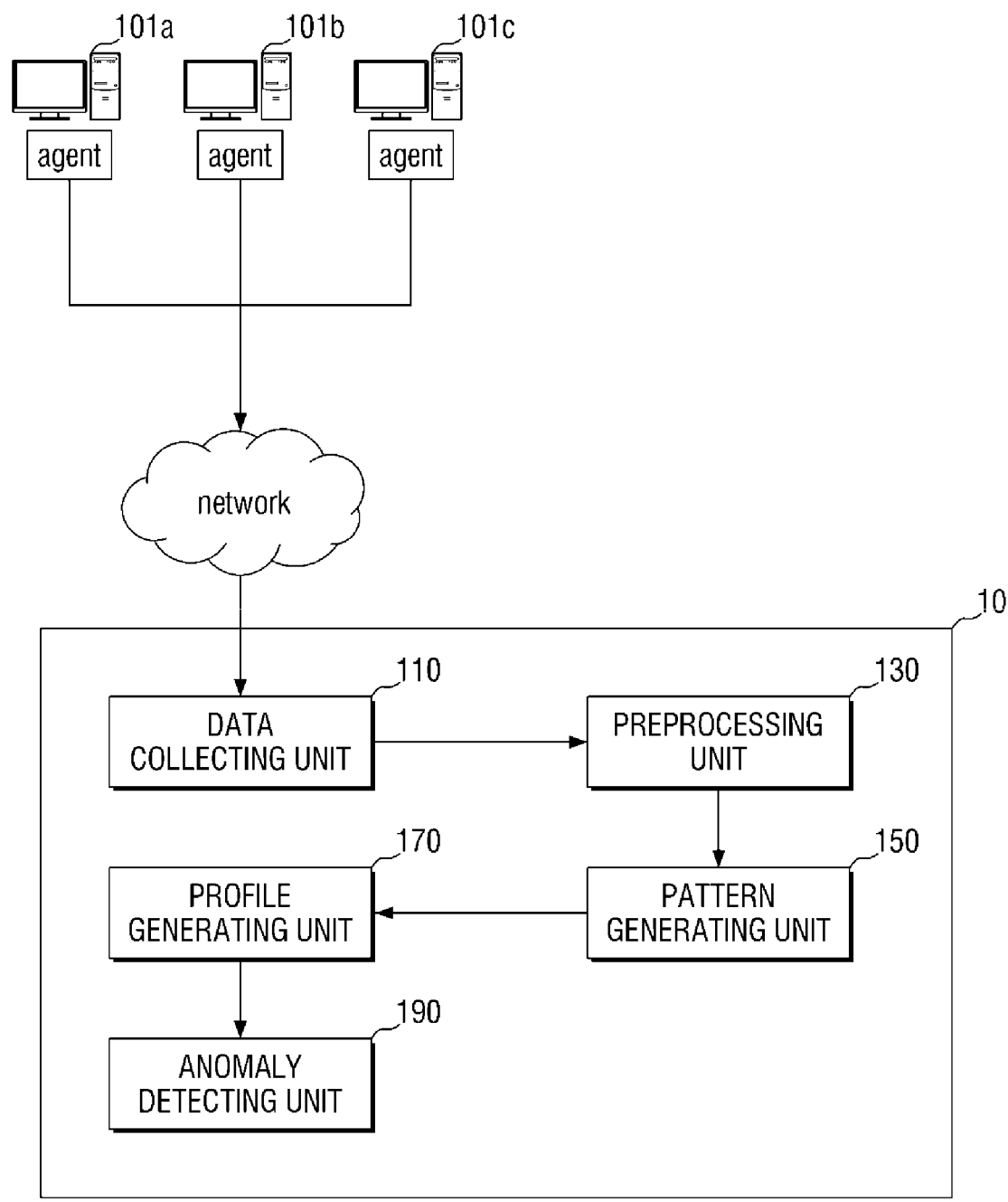
FIG. 2 is a block diagram of an apparatus for detecting an anomaly based on behavior-analysis according to an exemplary embodiment of the present disclosure.

FIG. 2 is a block diagram of an apparatus for detecting an anomaly based on behavior-analysis according to an exemplary embodiment of the present disclosure.

Referring to FIG. 2, data is collected at each of a plurality of users' computers 101a, 101b and 101c. An agent program installed on each user's computer may be used to collect data. The agent program collects data on behaviors of using documents on the users' PCs. As for the agent program, programs such as security programs and DRM agents that have been already used in the company may be reused. That is, no additional agent program is required to be installed for practicing the exemplary embodiment of the present disclosure.

The data collected by the agent of each of the computers 101a, 101b and 101c of the respective users is values obtained by counting the number of times that each of the users performed the behaviors one by one. The data obtained by counting the behaviors of using documents is transmitted to the apparatus 10 according to the exemplary embodiment of the present disclosure over a network.

The apparatus 10 collects data related to the behaviors of using documents by a data collecting unit 110, stores the collected data, and creates simple statistical data. For example, after collecting a counter of a user's behaviors on a particular day, the average of the behaviors of using documents for a certain period of time in the past is calculated, to create a past behavior counter.

It is to be understood that the past behavior counter may be created by each of the computers 101a, 101b and 101c, instead of the apparatus 10 for detecting an anomaly based on behavior-analysis. That is, the agent installed in each user's computer may count and store the user's behaviors of using documents, and may transmit the numerical values counted on the day and the numerical values of a certain period of time in the past to the apparatus 10.

A preprocessing unit 130 performs a preprocessing operation such as standardization or normalization by using the past behavior counters and the behavior counters on the day created by the data collecting unit 110. Then, a pattern generating unit 150 forms a cluster using the past behavior counters. In determining the number of clusters, it may be considered whether a cluster pattern is generated based on the characteristics of each cluster. The process of determining the number of clusters will be described in more detail with reference to FIGS. 10A to 10C.

After the pattern generating unit 150 creates patterns by using the users' past behavior counters, a profile generating unit 170 determines a past behavior pattern associated with the users' past behavior counters, and a current behavior pattern associated with the users' behavior counter on the day. By doing so, it is possible to compare the pattern of behaviors in the past with the pattern of behaviors of the day, and thus it is possible to preliminarily identify a user whose pattern has been changed as a suspect of internal information leakage.

An anomaly detecting unit 190 may compare the pattern of behaviors in the past with the pattern of behaviors on the day to see if it is suspected that internal information is leaked. In addition, it is also possible to calculate the pattern change trend by analyzing the frequency of the pattern change or the pattern of a specific user stored for each day as time-series data.

Each of the constituent elements of FIG. 2 described above may mean software or hardware such as FPGA (Field Programmable Gate Array) or ASIC (Application-Specific Integrated Circuit). However, the above-described constituent elements are not limited to software or hardware, but may be configured to be located in a storage medium capable of addressing, and may be configured to execute one or more processors. The functions provided in the above-mentioned constituent elements may be achieved by the further subdivided constituent elements, and may be achieved by a single constituent element that performs a specific function by adding a plurality of constituent elements.

FIG. 3 is a diagram illustrating a process of collecting data that may be used in some exemplary embodiments of the present disclosure.

FIG. 3 shows a process of collecting behaviors of using documents of user 1. Data 111 on the user's behaviors of using documents for each day is collected by the agent installed in the computer of the user 1. For example, the behaviors of using documents may include a variety of tasks such as [open], [create], [attach], [edit], [delete], [move], [copy], [print], [save] and [change permissions]. Although the above-listed tasks are most common, the kinds of behaviors may vary depending on the agent collecting the data.

An example of the user's behaviors of using documents will be described in detail below. On May 1, 2016, the user 1 has [opened] documents 27 times, has [copied] documents 3 times, has [attached] documents twice, and has [moved] documents 4 times. On May 2, 2016, the user 1 has [opened] documents 18 times, has [copied] a document once, has [attached] a document once, and has not [printed] or [moved] any document.

After collecting the data 111 that is obtained by counting the behaviors by the agent for every day, the data collecting unit 110 of the apparatus 10 generates a past behavior counter for creating a pattern by using the statistics of the past behavior data during a certain period of time.

Alternatively, the data collecting unit 110 may collect the behavior data on the day and the behavior data in the past period from each of the agents. The past behavior counter may be generated by accumulating behavior data for each day. The past behavior counter may be generated by either the apparatus 10 or the agent of each computer.

In the example of FIG. 3, the data was collected on May 15, 2016, and the data collected from May 1 to 14 is the previously collected data. In this example, the average of the data for the last two weeks is calculated and is created as the past behavior counter of the user 1. That is, data is collected everyday by the agent installed in the computer 101a of the user 1, and the average of data for a certain period of time is calculated every day to create the past behavior counter.

The period of two weeks is merely an example, and a longer or shorter period than two weeks may be used as desired. Referring to FIG. 3, the behavior counter on the day was collected on May 15, 2016, and the data for the last two weeks before May 15 was created as the past behavior counter. It can be seen that from the past behavior counter that the user 1 has [opened] documents 12.111 times, has [copied] documents 3.111 times, has [attached] documents 1.000 time, has [printed] documents 0.000 time, and has [moved] documents 3.003 times for the last two weeks.

It is to be noted that the average of the past behavior counter for a certain period of time in the past may not necessarily calculated. That is, the accumulated value obtained by counting the behaviors of using documents for a certain period of time in the past may be used. This is because the values are adjusted so as to have a certain range through the preprocessing step even if they are accumulated.

After the data collecting unit 110 collects the behavior counter on the day and generates the statistics of the past behavior counter, the data preprocessing unit 130 may perform a preprocessing step to generate a pattern. Referring to the example shown in FIG. 3, on May 15, the user 1 has [opened] documents 30 times, has [copied] documents 10 times, has [attached] documents 6 times, has [printed] documents twice, and has [moved] documents 3 times. Typically, it is necessary to open a document in order to edit or print the document, and thus the number times that the user opens documents is absolutely large. Therefore, on May 15, the number of behaviors of opening documents is 30 times, which is the most.

Therefore, rather than directly comparing these numerical values, it is necessary to rescale the values for convenience of comparison. That is, it is necessary to preprocess the data. The preprocessing step of the collected data 111 will be described with reference to FIGS. 4 to 5C.

Figures 4, 5A:
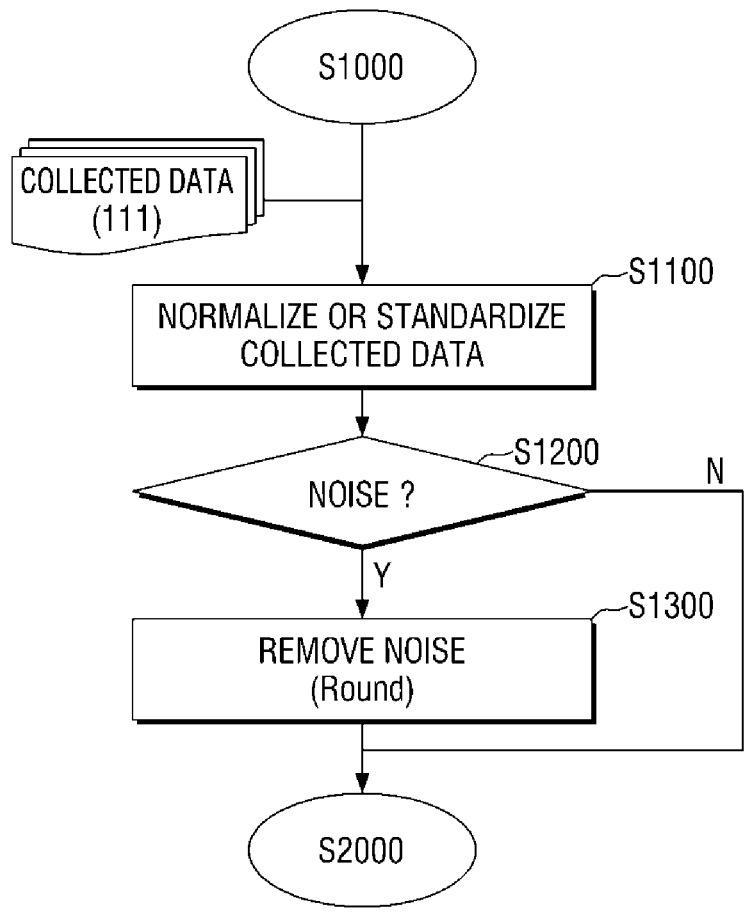

FIG. 4 is a flowchart for illustrating a data preprocessing step according to an exemplary embodiment of the present disclosure.

Referring to FIG. 4, after collecting data related to the behaviors of using documents by the agent installed in each user's computer (step S1000), the collected data is normalized or standardized (step S1100). Although the normalization or standardization is described as an example of the preprocessing step, a variety of rescaling methods may be used in addition to normalization or standardization.

After rescaling the data, a process of removing noise may be carried out (step S1200). The noise refers to data having values below a criterion after the rescaling. For example, when standardization is used as a method of scaling, the distribution of all data is made between 0 and 1. In doing so, an extremely small value such as 0.00001 does not contribute to creating a pattern, and thus the value may be modified to zero.

The process of removing the noise may be carried out by rounding off (step S1300). The number of decimal places to which a numerical value is rounded may be adjusted. A cluster is created by using preprocessed data in a subsequent process. To create more clusters, the number of decimal places to which numerical values are rounded increases. This is because it is easier to distinguish between clusters. In FIGS. 5A to 5C, numerical values are rounded to three decimal places.

FIGS. 5A to 5C are diagrams illustrating a data preprocessing step according to an exemplary embodiment of the present disclosure.

Referring to FIG. 5A, a formula of normalization is exemplified as a method of rescaling data. Referring to the formula, a numerical value can be rescaled by dividing the difference between a user's value $x_{useri}$, and the mean value for each behavior $mean_{act}$ by the square root of the sum of the squares of the difference between the user value $x_{useri}$, and the mean value for each behavior $mean_{act}$ for all the users. By performing the normalization, the collected data has a value between 0 and 1. As described above, the normalization may be used when it is desired to modify the distribution of data so that it has a value between 0 and 1.

For example, the behavior of [opening] may have a value from several tens to several hundreds, and the behavior of [printing] may have a value from several to several tens depending on the users. By performing normalization on the two behaviors both the behavior of [opening] and the behavior of [printing] have values between 0 and 1, and thus it is easier to compare them with each other.

In addition to the standardization illustrated in FIG. 5A, there are various rescaling methods. The following table summarizes the various methods available for the preprocessing. In the table below, the formula of (x−mean)/sqrt (sum((x−mean)^2)) is identical to the formula shown in FIG. 5A.

TABLE 1

| Name | Formula |
| --- | --- |
| standardization | (x − mean)/standard deviation |
| positional standardization | (x − median)/median absolute deviation |
| unitization | (x − mean)/range |
| unitization with zero minimum | (x − min)/range |
| normalization in range <−1, 1> | (x − mean)/max(abs(x − mean)) |
| quotient transformation | x/standard deviation |
| quotient transformation | x/range |
| quotient transformation | x/max |
| quotient transformation | x/mean |
| quotient transformation | x/sum |
| quotient transformation | (x/sqrt(SSQ) |
| normalization | (x − mean)/sqrt(sum((x − mean)^2)) |
| normalization with zero being the central point | (x − midrange)/(range/2) |

FIG. 5B shows results of normalization performed on the mean value of the past behavior counters for the last two weeks. For example, the user 1 has [opened] documents 12.111 times, has [copied] documents 3.111 times, has [attached] documents 1.002 times, has [printed] documents 0.000 time, and has [moved] documents 3.003 times. For example, for the last two weeks, on average, the user 2 has [opened] documents 41.010 times, has [copied] documents 5.013 times, has [attached] documents 3.202 times, has [printed] documents 3.004 time, and has [moved] documents 0.001 times. In addition, for the last two weeks, on average, the user N has [opened] documents 10.003 times, has [copied] documents 1.083 times, has [attached] documents 4.073 times, has [printed] documents 0.002 time, and has [moved] documents 0.002 times.

By performing the normalization illustrated in FIG. 5A on the above values, the behaviors of [open], [copy], [attachment], [print], and [move] are adjusted to have values between 0 and 1. By doing so, it is easy to understand where a particular behavior of each user is positioned.

After the normalization, the user 1 has the values such as 0.027 for [open], 0.008 for [copy], 0.004 for [attach], 0.011 for [print], 0.090 for [move]. Similarly, the user 2 has the values such as 0.050 for [open], 0.013 for [copy], 0.007 for [attach], 0.034 for [print], and 0.001 for [move]. Lastly, the user N has the value of 0.023 for [open], the value of 0.003 for [copy], the value of 0.013 for [attach], the value of 0.017 for [print], and the value of 0.002 for [move].

It can be seen that from the above that the number of times that the user 1 has opened documents corresponds to 0.027, the number of times that the user 2 has opened documents corresponds to 0.050, and the number of times that the user N has opened documents corresponds to 0.023. As such, the data can be modified by the normalization so that it has values between 0 and 1.

In addition, the type and number of the collected behavior of using documents may vary depending on the agent. The collected data from a plurality of agents may be used in combination if desired. For example, it is possible to use both of the behavior collected from a security-related agent, and the behavior collected from a DRM-related agent.

However, if there are too many collected behaviors, the performance may be degraded when analyzing the patterns. Therefore, by analyzing the correlation between the behaviors to merge several behaviors into one, the patterns may be analyzed.

In FIG. 5B, normalization was performed on the average number of times of the behaviors for each user over the last two weeks. In FIG. 5C, normalization was performed on the number of times of the behaviors on that day, that is, May 15, 2016. The number times of behaviors of [opening] of the user 1, i.e., 30 times was changed to the value of 0.013 after normalization. Likewise, the number times that the user 2 has opened documents, i.e., 10 times was changed to the value of 0.002 after normalization.

In addition, after the normalization, there may be a difference between the total number of users of the past behavior counters and the total number of users of the behavior counters on the day. This is because there may be a person who is newly employed or a person who has left. Even if there is a change in the number of people, normalization is performed so that the all the data has the value between 0 and 1.

Figures 6, 7A:
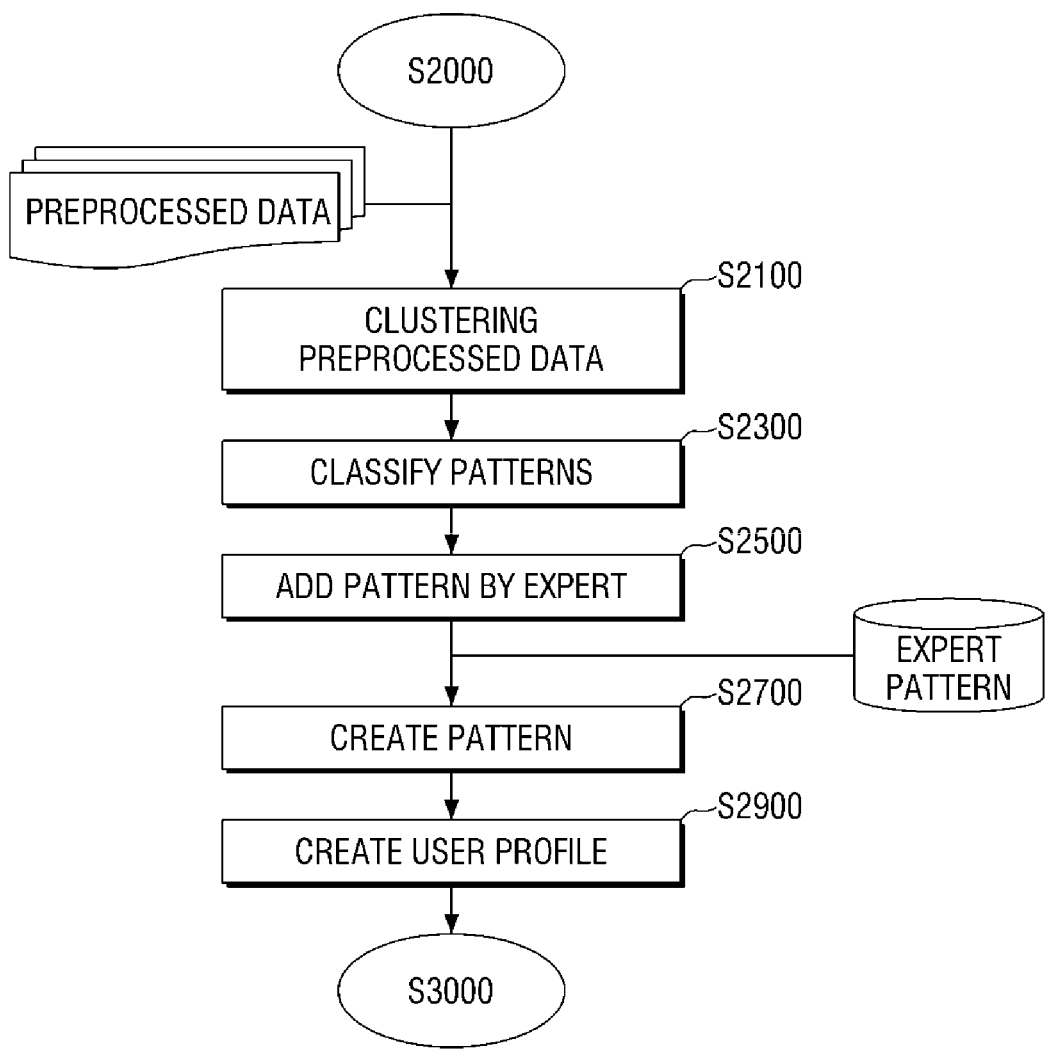

FIG. 6 is a flowchart for illustrating a process of creating patterns according to an exemplary embodiment of the present disclosure.

Referring to FIG. 6, the collected data is preprocessed and clusters are created using the preprocessed data (step S2100). In order to perform clustering, it is necessary to decide the number of clusters to be created. A method for determining the number of clusters to be created will be described in more detail with reference to FIGS. 9 to 10C.

After creating the clusters with the past behavior counters as learning data, patterns are classified using the characteristics of each of the clusters (step S2300). Patterns can be generated based on the past behavior counters using such unsupervised learning. In addition, experts (or administrators of the system) may add a pattern (step S2500). Normally, it may not necessary to add such a pattern by experts. It is necessary to add a pattern arbitrarily by an expert at the early stage of machine learning where the number of the past behavior counters is small and accordingly there may not be a variety of automatically classified patterns.

When an expert adds a pattern, she/he may select a value between 0 and 1 for a necessary leakage detection pattern to add it. For example, an expert may add a cluster mainly associated with [copy] or a cluster mainly associated with [print]. To this end, the added cluster may be set such that it has the value of 0 for most of the other behaviors and the value close to 1 for [copy] or [print].

When K patterns are automatically created using a clustering algorithm and L patterns are added by experts, finally (K+L) patterns are created (step S2700). By using the created patterns, the pattern of the past behavior counters and the pattern of the behavior counters on the day of a user are determined (step S2900). In this manner, the pattern of past behavior counters can be compared with the pattern of behavior counters on the day.

FIGS. 7A to 7D are diagrams for illustrating a process of creating patterns of clusters according to an exemplary embodiment of the present disclosure.

FIG. 7A shows past behavior counters of user 1 to user N after normalization. Since the normalization has been performed, the values range from 0 to 1. In the example shown in FIG. 7A, only the normalization has been performed on the data but noise is not removed therefrom yet. Noise may be removed by rounding the values to the three decimal places.

For example, in FIG. 7A, the behavior of [attaching] of the user 1 has the value of 0.004 after the normalization. As this value is so small and has the value of zero by performing rounding the value to the three decimal places. That is, by approximating such small values to zero, the operation speed can be further increased when clusters for generating a pattern are created.

Referring to FIG. 7B, it can be seen that K clusters are created by using the past behavior counters of the user 1 to user N. In doing so, well known clustering techniques such as K-means, K-medoids, hierarchical cluster and DBSCAN may be used.

The above-described techniques will be described briefly. The K-means algorithm is for grouping given data into K clusters. It works by minimizing the variance of the distance between the clusters. The K-means algorithm is one of the representative unsupervised learning.

The K-means algorithm performs an operation to calculate the mean value and thus is sensitive to anomalies. To overcome such shortcoming, the K-medoids algorithm has been proposed. The K-medoids algorithm chooses an actual object representing the cluster, instead of calculating the mean value. The rest of the objects are clustered into the most similar representative objects.

Next, the DBSCAN (Density-based spatial clustering of applications with noise) algorithm is a clustering technique that uses data density, instead of the distribution of data, i.e., the distance from the average like the K-means algorithm.

Referring to FIG. 7B, it can be seen that the values of behaviors of the K clusters are expressed up to the second decimal place since the preprocessing step of changing the values close to zero to zero and rounding off to the third decimal places has been performed thereon. As the clusters are created automatically, the clusters are named as A-1 to A-K with the prefix A from "automatically."

After creating K clusters as shown in FIG. 7B, it is required to find the characteristics of each of the clusters. A method of finding the characteristics of each of the clusters will be described in detail with reference to FIGS. 10A to 10C.

Referring to FIG. 7B, the cluster A-1 has the value of 0.80 for [open]. Besides, the cluster A-1 has the value of 0.10 for [copy], has the value of 0.00 for [attachment], has the value of 0.10 for [print], has the value of 0.20 for [move]. It can be seen that that the users belonging to the cluster A-1 have opened documents more than other tasks. That is, it may be said that the behavior of [open] is the representative act representing the cluster A-1. Accordingly, the pattern of the cluster A-1 becomes [open].

Similarly, it can be seen that the cluster A-2 has the values of 0.01 for [open], the value of 0.01 for [copy], the value of 0.10 for [attach], the value of 0.10 for [print], and the value 0.20 for [move]. In the cluster A-2, the values for [attach], [print] and [move] are larger than those of other behaviors. That is, it may be said that the behaviors of [attach], [print] and [open] are the representative act for the cluster A-2. Accordingly, the pattern of the cluster A-2 becomes [attach], [print] and [move].

The process of determining the pattern of clusters proceeds as follows: First, the mean value of the number of times of behaviors of using documents of each of the users belonging to the first cluster is determined and set as the representative value of the first cluster. Subsequently, the threshold value of the first cluster is set using the average and the standard deviation of the mean values of the respective behaviors of using documents representing the first cluster. Lastly, the behavior of using documents exceeding the threshold value may be chosen as the behavior that characterizes the first cluster.

For example, let us assume that there is data for five users. Let us assume that the user's data is as shown in Table 2, and that these five users are grouped into one cluster X:

Table 2

| User    | Open  | Copy  | Attached | Print | Move  |
|---------|-------|-------|----------|-------|-------|
| User1   | 0.027 | 0.008 | 0.004    | 0.011 | 0.000 |
| User2   | 0.010 | 0.013 | 0.002    | 0.004 | 0.001 |
| User3   | 0.002 | 0.001 | 0.001    | 0.004 | 0.011 |
| User4   | 0.013 | 0.007 | 0.033    | 0.147 | 0.027 |
| User5   | 0.003 | 0.083 | 0.083    | 0.007 | 0.002 |
| Average | 0.011 | 0.022 | 0.024    | 0.034 | 0.008 |

In this example, the values for [open], [copy], [attach], [print] and [move] representing the cluster X are 0.011, 0.022, 0.024, 0.034, 0.008, respectively, which are the averages of the past behavior counters from user 1 to user 5. Subsequently, in order to find the behavior representing the cluster X from among the behaviors of [open], [copy], [attach], [print] and [move], it is necessary to calculate the mean value and standard deviation of the values 0.011, 0.022, 0.024, 0.034 and 0.008.

By calculating the average and the standard deviation of the values 0.011, 0.022, 0.024, 0.034 and 0.008 representing the cluster X, we obtain the average of 0.020 and the standard deviation of 0.010. The threshold value can be determined using the average and standard deviation thus obtained. Specifically, the threshold value can be calculated by using the formula of mean value+standard deviation×n (where n is a natural number).

Typically, the value such as the number of times of behaviors of using documents is expressed in the form of a normal distribution. In the normal distribution, in the range of the mean±standard deviation×1, 68.26% of the total data is included. In addition, in the range of the mean±standard deviation×2, 95.46% of the total data is included. Lastly, in the range of the mean±standard deviation×3, 99.72% of the total data is included.

Therefore, if the threshold value is set to the average+standard deviation×1, values exceeding this are not included in 66.26%. Alternatively, if the threshold value is set to the average+standard deviation×2, values exceeding this are not included in 95.46%. Alternatively, if the threshold value is set to the average+standard deviation×3, values exceeding this are not included in 99.72%.

In this manner, the threshold value can be determined by the formula of mean+standard deviation×n. The value of n may be selected appropriately. Typically, n is selected as 2. When the value of n is selected as 2, the behavior exceeding that value is an outlier corresponding to 5%, which is not included in 95%. Thus, it can be regarded as the behavior representing the cluster. That is, it can be regarded as the pattern of the cluster.

In the above example, if the value of n is set to 1, the threshold will have the value of 0.030, which is the sum of the average of 0.020 and the standard deviation of 0.010. Since the values for [open], [copy], [attach], [print] and [move] representing the cluster X are 0.011, 0.022, 0.024, 0.034, 0.008, respectively, the value of 0.034 for [print] exceeds 0.030 and thus [print] is the behavior representing the cluster X.

If the value of another behavior such as [change permissions] exceeds 0.030 in addition to [print], the patterns for the cluster X may be [print] and [change permissions]. The patterns of clusters can be multiple behaviors.

It is to be understood that if the value of n is set to 2, the threshold is 0.040, and there is no behavior having the value exceeding 0.040 among the values of [open], [copy], [attach], [print] and [move]. When this happens, the cluster X is classified as a non-feature cluster. That is, the cluster X is classified as a patternless cluster.

In the above-described process, the cluster A-1 to the A-K cluster illustrated in FIG. 7B selected their respective representative behaviors. As the major behavior of using documents, [open] was selected as the pattern for the cluster A-1, [attach], [print] and [move] were selected as the pattern for cluster A-2, and [open] and [attach] were selected as the pattern for the cluster A-K.

On the other hand, the cluster A-3 has the value of 0.00 for [open], the value of 0.01 for [copy], the value of 0.01 for [attach], the value of 0.00 for [print], and the value of 0.00 for [move], which are all similar. The cluster A-3 has similar values of behaviors, that is, no particular behavior is significant, and thus is a patternless cluster. In this case, the cluster A-3 can be classified as an ordinary cluster with no pattern.

Next, referring to FIG. 7C, a pattern arbitrarily added by an expert can be seen. If there are enough users to create clusters, various clusters can be created. That is, various patterns can be made. For example, the expert may add a new cluster pattern indicating a new representative behavior aside from representative behaviors belonging to designated cluster patterns (e.g. cluster patterns illustrated in FIG. 7b). However, if there are few users or if training data is insufficient, only a few patterns of clusters may be made. In this case, the administrator of the system may add a pattern. It is to be noted that a process of adding a pattern by an administrator is optional.

Referring to FIG. 7C, the administrator added L clusters, cluster C-1 to cluster C-L, with the prefix from "Custom." The cluster C-1 has the value of 0.90 for [attach] and the value of 0.80 for [print]. Accordingly, users who frequently use [attach] and [print] are grouped into the cluster C-1. Likewise, the cluster C-L has the value of 0.80 for [copy], the value of 0.80 for [attach] and the value of 0.8 for [move]. Accordingly, users who frequently use [copy], [attach] and [move] have been grouped into the cluster C-L.

FIG. 7D is a diagram showing the automatically classified clusters shown in FIG. 7B together with the clusters added by the administrator shown in FIG. 7C. After determining the patterns of the clusters, except the patternless clusters, that is, the clusters classified as the ordinary clusters, the clusters having patterns may be used to create the user profiles later.

Figure 8:
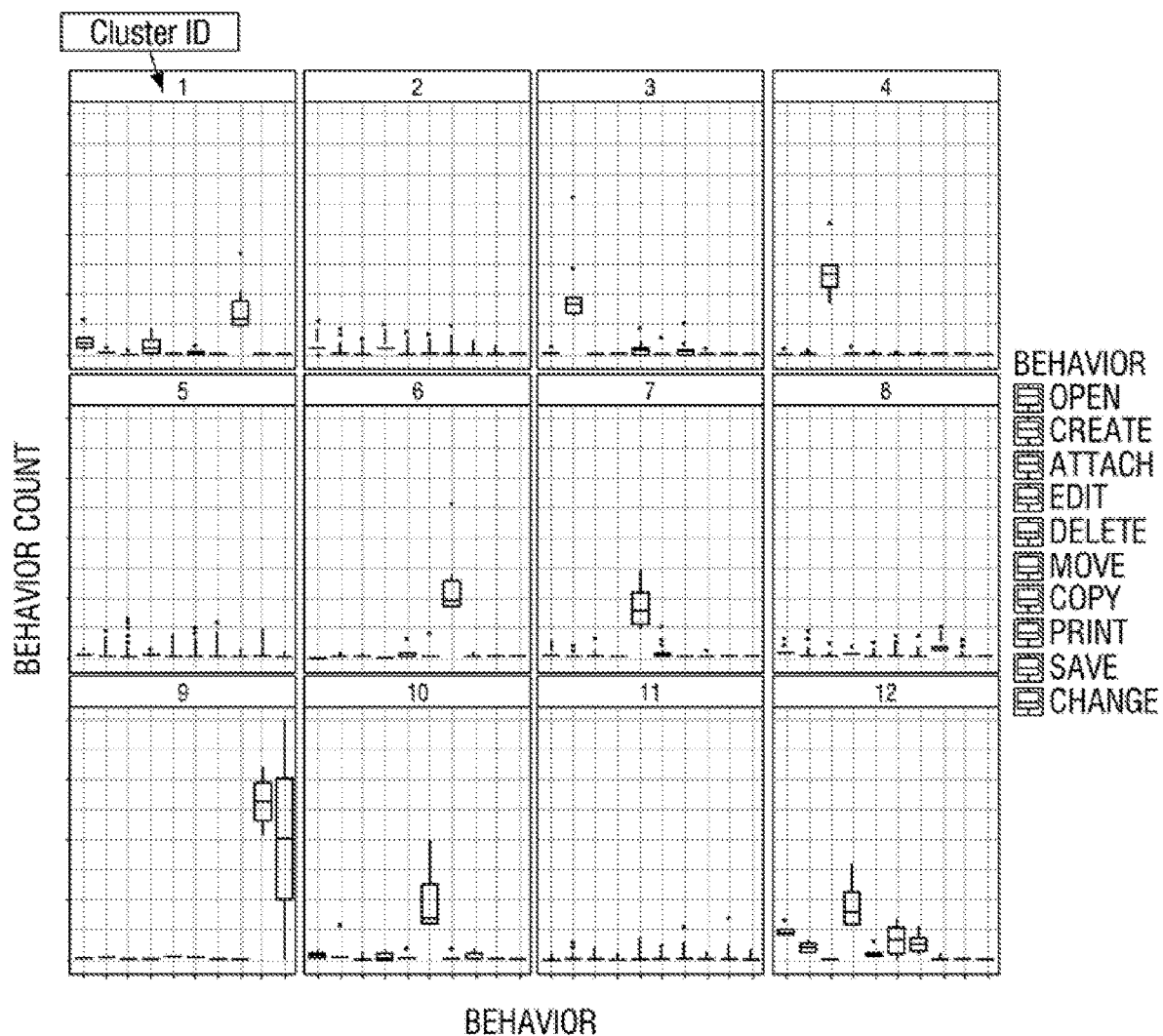
FIG. 8 is a graph showing patterns of clusters that may be used in an exemplary embodiment of the present disclosure.

FIG. 8 is a graph showing patterns of clusters that may be used in an exemplary embodiment of the present disclosure.

Referring to FIG. 8, a total of 12 clusters from 1 to 12 are shown. The values of ten behaviors of [open], [create], [attach], [edit], [delete], [move], [copy], [print], [save] and [change permissions] are shown on the x-axis of each of the clusters.

Since each of the clusters is created using the normalized data using the formula of FIG. 5A, the value of the y-axis in FIG. 8 has the values from 0 to 1.0. The graph is depicted in the form of bar charts for each behavior. This indicates the range of values of the behaviors of the users belonging to the clusters. The horizontal line drawn between the lower and upper limits of the bar chart is the mean value of the data distributed between the lower and upper limits.

Referring to FIG. 8, cluster 1 has [print] as the pattern, which is the third behavior from the end. Cluster 2 has no particular pattern. Cluster 3 has [create] as the pattern, which is the second behavior. Cluster 4 has [attach] as the pattern, which is the third behavior.

Likewise, cluster 5 has no pattern, cluster 6 has [copy] as the pattern, cluster 7 has [delete] as the pattern, and cluster 8 has no pattern.

In addition, cluster 9 has [attach] and [print] as the pattern, cluster 10 has [move] as the pattern, cluster 11 has no pattern, and cluster 12 has [edit] as the pattern.

Figure 9:
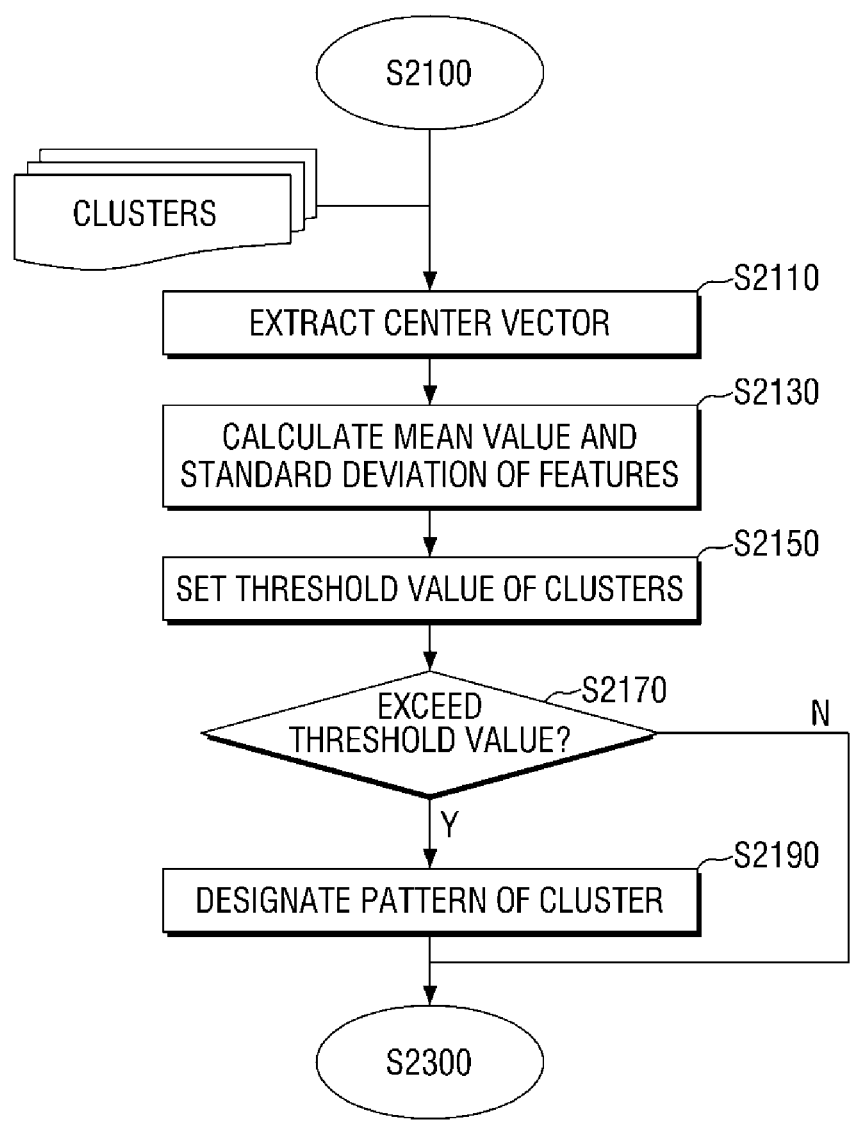
FIG. 9 is a flowchart for illustrating a process of determining the number of clusters according to an exemplary embodiment of the present disclosure.

FIG. 9 is a flowchart for illustrating a process of determining the number of clusters according to an exemplary embodiment of the present disclosure.

The process of designating the patterns of the clusters, which has been described with reference to FIGS. 7A to 7D, is illustrated in FIG. 9 as the flowchart. Referring to FIG. 9, after clusters are created, a center vector of each of the clusters is extracted (step S2110). The center vector of a cluster refers to the mean value of the behaviors of each user belonging to the cluster described above. That is, a value representative of the cluster.

In the example using Table 2, the values of 0.011, 0.022, 0.024, 0.034 and 0.008 for [open], [copy], [attach], [print] and [move], respectively, representing the cluster X were obtained by using the average. Assuming that each of the behaviors is one dimension, the cluster X is data with five dimensions: [open], [copy], [attach], [print], [move], and the center vector is 0.011, 0.022, 0.024, 0.034 and 0.008, respectively.

Subsequently, the mean value and the standard deviation of the behaviors (the features) are calculated for each of the clusters (step S2130). This is a process of determining the threshold value of each of the clusters. In above example, the process of calculating the mean value of 0.020 and the standard deviation of 0.010 for the values of the five behaviors 0.011, 0.022, 0.024, 0.034 and 0.008 is the process of determining the threshold value of the cluster X.

The threshold value is set using the mean value and standard deviation of the behaviors of each of the clusters (step S2150). The threshold value may be calculated from the formula mean+standard deviation×n. Typically, 2 is used as the value of n.

After setting the threshold value, the value of each of the behaviors of the clusters is compared with the threshold value (step S2170). If the value of any of the behaviors of the clusters exceeds the threshold value, it can be defined as the featuring behavior for the cluster. That is, it may be designated as the pattern of the cluster (step S2190).

If the values of all the behaviors of a cluster are smaller than the threshold value, the cluster is classified as a cluster having no pattern. A cluster having no pattern is referred to as an ordinary cluster. The threshold value is set to every cluster, and a significant behavior is selected from each of the clusters and designated as the pattern of the cluster.

It is to be noted that the processes from steps S2100 to S2300 may be repeatedly performed. That is, the number of clusters can be determined by repeating the processes of designating the pattern of the clusters. This will be described in more detail with reference to FIGS. 10A to 10C.

Figure 10C:
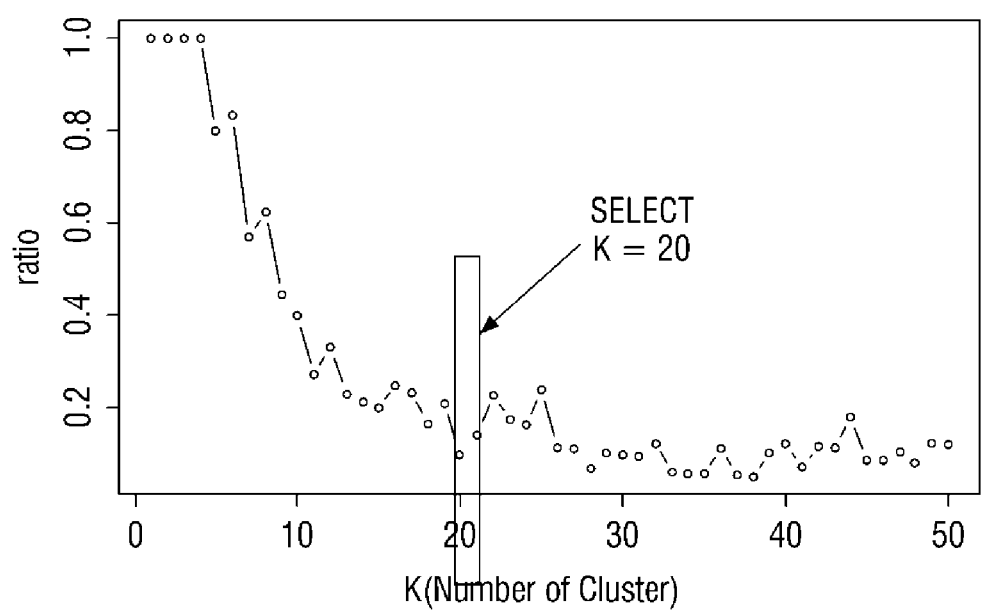

FIGS. 10A to 10C are diagrams for illustrating a process of determining the number of clusters according to an exemplary embodiment of the present disclosure.

FIG. 10A shows a process of setting a threshold value of a cluster and designating a behavior exceeding the threshold value as the pattern of the cluster. In the example of FIG. 10A, the second behavior [create] exceeds the threshold value and is designated as the pattern of the cluster.

The method according to the exemplary embodiment of the present disclosure is for detecting the internal information leakage behavior by analyzing the behaviors of using documents, which usually occurs when a particular behavior is suddenly increased. Accordingly, the threshold value is set to the value equal to the mean value+standard deviation×2, and a behavior exceeding the threshold value is designated as the pattern of the cluster.

In some implementations, when anomalies are detected by monitoring various behaviors, the value equal to the mean value−standard deviation×2 may be set as the lower threshold value, and a behavior having a value below the threshold value may be designated as the pattern of the cluster.

That is, the lower threshold value equal to the mean value−standard deviation×n may be set in addition to the upper threshold value equal to the mean value+standard deviation×n, such that a behavior above the upper threshold value or below the lower threshold value may be designated as the pattern of the cluster. When a cluster has a pattern thus designated, it is defined as a pattern cluster. Otherwise, it is defined as an ordinary cluster.

That is, a cluster having the pattern of at least behavior exceeding the threshold value is defined as a pattern cluster, and a cluster having no pattern is defined as an ordinary cluster, and a ratio between the clusters is calculated. FIG. 10B shows an equation for calculating a ratio of the number of ordinary clusters to the number of all clusters. The number of clusters can be determined by using the ratio.

Typically, in order to perform clustering, it is necessary to decide the number of clusters. In the K-means algorithm, which is a typical clustering algorithm, a user is required to input K as a parameter. There is, of course, a separate algorithm for determining the value of K.

For example, the Calinski-Harabasz index is a method of selecting the number of clusters using the distribution within a cluster WSS (total within sum of square) and the distribution between clusters BSS (between sum of square). Although the number K of clusters can be determined by the above method for maximizing the distribution of data, it is not appropriate to use it because the object of the exemplary embodiments of the present disclosure is directed to automatically generating/extracting patterns.

Accordingly, an object of the present disclosure is to provide a method for determining the number of clusters by automatically generating/extracting a pattern. To this end, the ratio obtained from the equation of FIG. 10B is used. FIG. 10C shows a graph of the ratio versus the value of K.

Referring to FIG. 10C, it can be seen that clusters are created by increasing gradually from K=1 to K=50, the patterns of the clusters are designated, and the ratio of ordinary clusters to pattern clusters is calculated.

As can be seen from FIG. 10C, when the value of K is small, the clusters include data with various tendencies and thus patterns of clusters may not be significant. However, if the value of K is gradually increased, only the data having a certain tendency is grouped together and thus the pattern of the clusters appear. That is, the number of pattern clusters increases as compared with the number of ordinary clusters.

As a result, as the value of K is gradually increased, the graph shows saturation from 1 toward 0 as shown in FIG. 10C. If no better results comes out by a cluster than before, the previous value of K may be determined as the number of clusters.

That is, the point at which the slope becomes gentle in the graph of FIG. 10C is referred to as the elbow point, and the value of K at that point is determined as the appropriate number of clusters. In the example of FIG. 10C, the slope of the ratio of the ordinary clusters to the pattern clusters becomes gentle at K=20.

According to the exemplary embodiment of the present disclosure, the number of clusters can be determined using the ratio of the number of clusters having no pattern to the number of clusters having patterns. As described above, in order to determine the number of clusters, the process from S2100 to S2300 of FIG. 9 should be repeated while gradually increasing the value of K from 1. As a result, the graph shown in FIG. 10C can be obtained and the optimum K can be determined.

Figure 11:
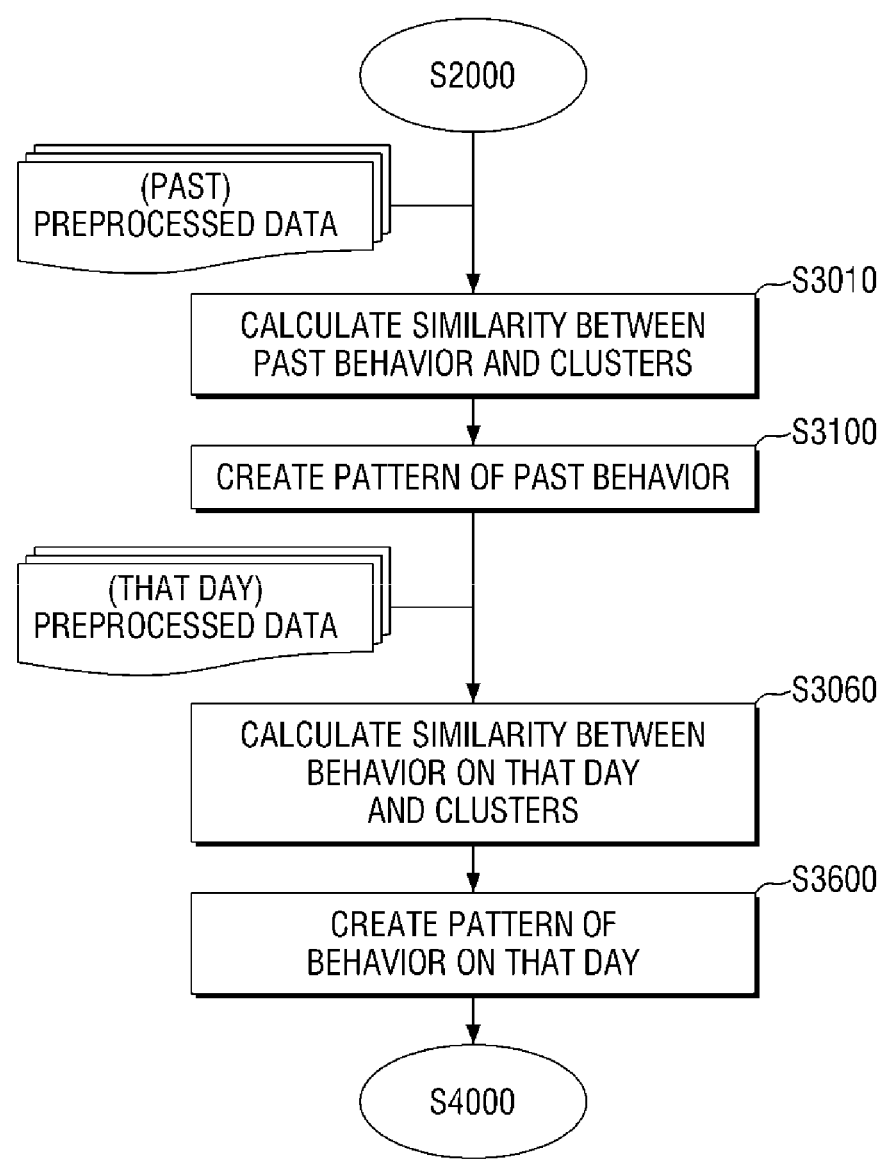
FIG. 11 is flowchart illustrating a process of generating a user profile according to an exemplary embodiment of the present disclosure.

FIG. 11 is flowchart illustrating a process of generating a user profile according to an exemplary embodiment of the present disclosure.

FIG. 11 shows a process of determining a pattern of a user by using a cluster having a pattern among K clusters automatically classified and L patterns added by an expert. That is, the process of creating a user profile can be seen.

In the foregoing description, the behaviors of using documents are collected each day by the agent in a user's computer, and the data collecting unit 110 creates the data on a particular day and data in the period of time in the past. In order to detect a change in the user's pattern, the similarity between the preprocessed data of the last two weeks and the cluster is calculated (step S3010). If the data of the last two weeks is close to a particular cluster, the data belong to the pattern of the cluster (step S3100).

Likewise, the similarity between the preprocessed data of the day with the cluster is calculated (step S3060). If the data of the day is close to a particular cluster, the data of the day belongs to the pattern of the cluster (step S3600). Subsequently, by comparing the pattern of the past behavior counter of a user with the pattern of the behavior counter on the day, it is possible to detect whether there is a change in the user's behavior of using documents (step S4000).

Various methods may be used in determining whether certain data and clusters are close to each other, in other words, in calculating the similarity between the data and the clusters. For example, Euclidean distance measure to measure distance in space, Manhattan distance measure to find the difference in the absolute value between coordinates of two points, Minkowski distance measure to calculate distance measure between two points, a cosine distance measure to compare the angles of two points with the origin, etc. may be used.

Figure 12:
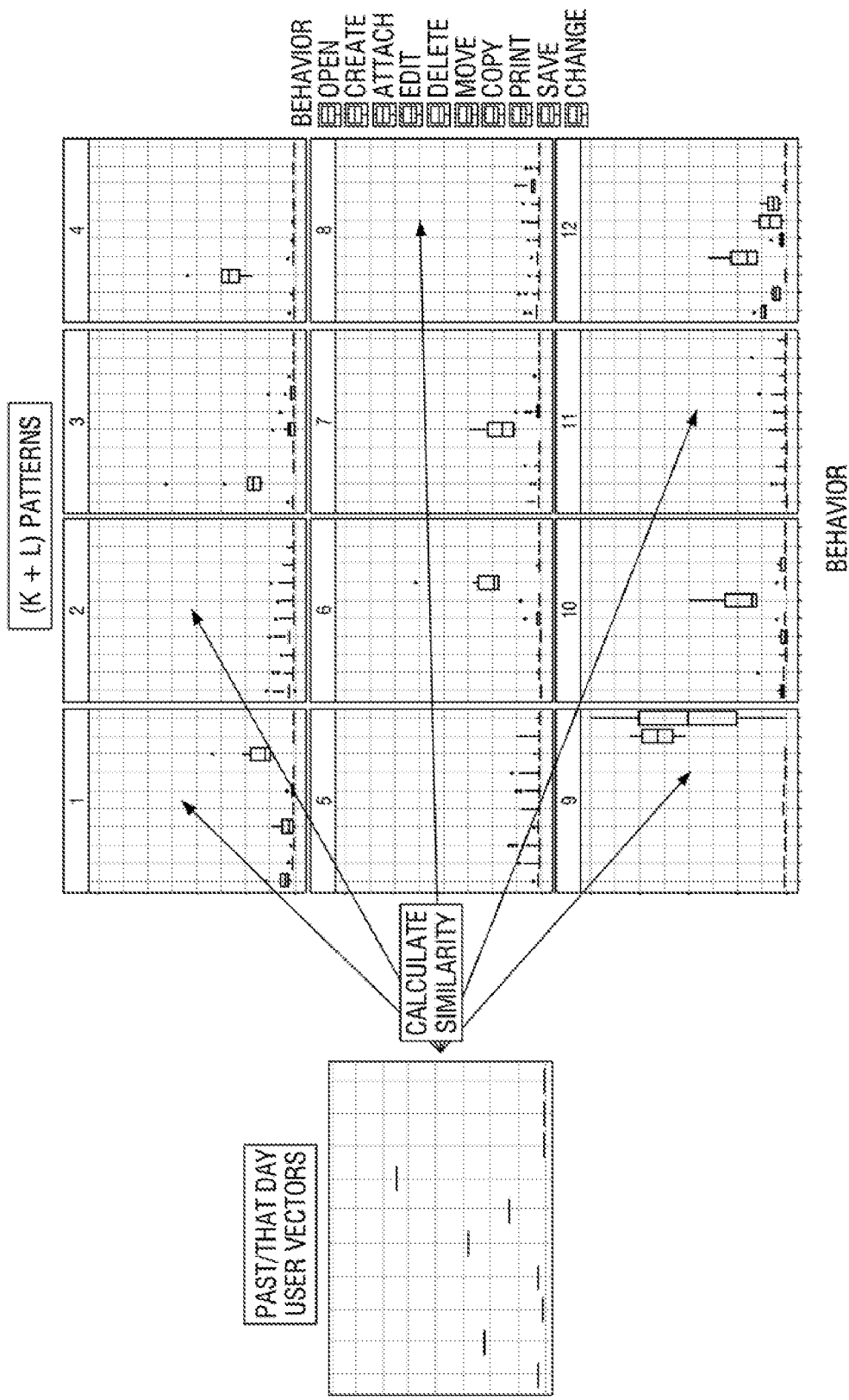
FIG. 12 is a diagram for illustrating a process of creating a user profile according to an exemplary embodiment of the present disclosure.

FIG. 12 is a diagram for illustrating a process of creating a user profile according to an exemplary embodiment of the present disclosure.

Referring to FIG. 12, 12 clusters are shown on the right side. On the left side, the user's behavior counter on the day and the data for the last two weeks are shown. By comparing each of the them with the clusters on the right side, the pattern of the past behavior counter and the pattern of the behavior counter on the day. Then, by comparing them with each other, it is possible to detect if there is a behavior of leaking internal information.

A way of for identifying a suspect who is likely to leak internal information is as follows: The past profile is compared with the profile on the day, and if there is a change in the behavior of using documents of each of the users, they may be designated as a group of candidate suspects. In particular, a user whose profile has changed from a low security risk to a high security risk is more likely to be a suspect.

The degree of security risk may be defined for each of the profiles, i.e., for each of the patterns of the clusters by assigning weights to the collected behaviors. Typically, the behaviors such as [read] and [create] may be defined as behaviors having a low degree of risk. The behaviors such as [print], [attach], [change permissions] and [save as general document] may be defined as behaviors having a high degree of risk.

For example, if a user's the past behavior counter was [read] pattern and the behavior counter on that day was changed to the [print] pattern, the user's pattern of behaviors has been changed from a low risk group to a high risk group, and thus the user may be identified as a suspect.

In particular, since a cluster can have a combination of a plurality of behaviors as the pattern, a cluster having a pattern of [print] and [attach] may be classified as a cluster having a higher degree of risk than a cluster having a pattern of [print] only by assigning weights to the behaviors.

In addition, a behavior profile of a specific group (department, etc.) may also be used as a criterion for identifying information leakage suspects. Different departments have different tasks, and each department has a certain tendency. Therefore, if the members of a certain department belong to the pattern of [read], and then all the members have been changed to have the pattern of [print], it is considered that the task of the department has been changed. Thus, even if the pattern of one of the members is changed from [read] to [print], she/he may not be identified as a suspect.

By using the exemplary embodiments of the present disclosure described above with reference to FIGS. 1 to 12, it is possible to detect an anomaly in advance by using unsupervised learning. Previously, it was necessary to analyze all users' data, so it was difficult to easily determine whether the pattern of a user has changed. In contrast, according to the exemplary embodiment of the present disclosure, only the user whose pattern has significantly changed can be identified, so that it is possible to limit the candidate suspects to some persons. Thus, by limiting the candidate suspect to be monitored to some persons, it is possible to save the monitoring time efficiently. In addition, the users limited to the candidate suspects to be monitored can be identified as high risk users or low risk users by giving them priorities based on the number of files, frequency of appearance of users, etc.

Companies that have a "personal information processing system" are required to conduct an inspection to "detect abnormal behavior" in order to comply with the Personal Information Protection Act. The method for detecting an anomaly according to an exemplary embodiment of the present disclosure can be applied when developing such a solution. Specifically, according to the "Measures to Ensure the Stability of Personal Information" published by the Ministry of Government Administration and Home Affairs related to the "Personal Information Protection Act," detailed criteria for securing personal information are disclosed. Referring to item "7. storage and check of access records," it is recommended to detect unusual activities such as processing of personal information without permission, and inquiry, correction, download and deletion of a large amount of personal information, and to take appropriate actions, which is the object of the present disclosure. Therefore, it is possible to utilize the method according to the exemplary embodiment of the present disclosure as a solution for protecting information of a company.

Figure 13:
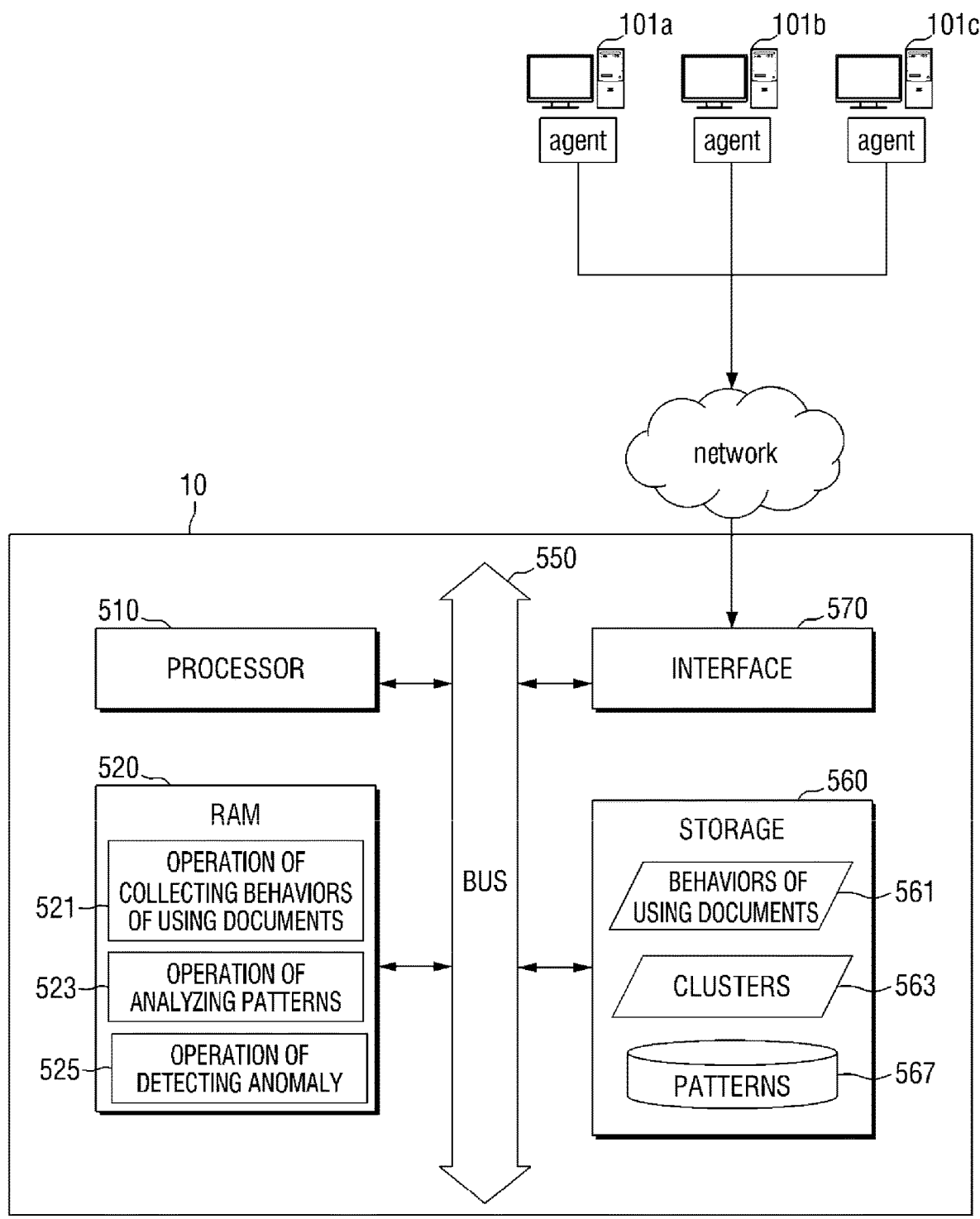
FIG. 13 is a block diagram showing hardware configuration of an apparatus for detecting an anomaly based on behavior-analysis according to an exemplary embodiment of the present disclosure.

FIG. 13 is a block diagram showing hardware configuration of an apparatus for detecting an anomaly based on behavior-analysis according to an exemplary embodiment of the present disclosure.

Referring to FIG. 13, the apparatus 10 according to the exemplary embodiment of the present disclosure may include one or more processors 510, a memory 520, a storage 560, and an interface 570. The processor 510, the memory 520, the storage 560 and the interface 570 transmit and receive data via a system bus 550.

The processor 510 executes a computer program loaded into the memory 520, and the memory 520 loads the computer program from the storage 560. The computer program may include an operation of collecting behaviors of using documents 521, an operation of analyzing patterns 523, and an operation of detecting an anomaly 535.

The operation of collecting the behaviors 521 collects data related to behaviors of using documents from the agents installed in the user computers 101a, 101b and 101c via the interface 570. The collected data is stored in the storage 560 as the behaviors of using documents 561.

The behaviors of using documents refers to a variety of tasks such as [open], [create], [attach], [edit], [delete], [move], [copy], [print], [save] and [change authority]. The data related to the behaviors refers to the values obtained by counting the behaviors of using documents for each of the users day by day.

In addition, the operation 521 may include gathering the user's data for each day to create statistic data on the behaviors during a provided period of time. For example, the mean value may be calculated for each of the behaviors such as [open], [write], [attach], [edit], [delete], [move], [copy], [print], [save] and [change permissions]. The data is used in creating patterns with the past behavior counter.

The operation 523 may include reading the behavior counters on the day and the past behavior counters of the behaviors 561 stored in the storage 560 via the system bus 550 into the memory 520. Then, the clusters are created using the past behavior counters. After creating the clusters, the average of the values of behaviors of using documents of users belonging to each of the clusters is calculated, which is determined as the center vector value representing the cluster.

After calculating the center vector values of the clusters, the mean value and standard deviation of the behaviors are calculated for each of the clusters. The threshold value is set for each of the clusters using the mean value and the standard deviation. The behaviors exceeding the threshold value becomes the pattern of the cluster. If a cluster has no behavior exceeding the threshold value, it is classified as an ordinary cluster.

The operation 523 may include determining the appropriate number of clusters by using the ratio of the number of the ordinary clusters having no pattern and the number of the clusters having at least one behavior exceeding the threshold value and thus having the pattern. In addition, the operation 523 may include receiving a pattern designated by an expert via the interface 570, if necessary.

After determining the appropriate K, the operation 523 may include creating clusters to designate the pattern of the past behavior counters of the users, and storing the clusters 563 in the storage 560 via the system bus 550. In addition, the pattern automatically extracted from the clusters and the pattern inputted by the expert are stored in the storage 550 as the pattern 567.

The operation 525 may include loading the past behavior counters and the behavior counters on the day of the behaviors 561 in the storage 560 to compare them with the pattern 567. That is, the pattern of the past behavior counters and the pattern of the behavior counters on the day are determined and compared. If the pattern of a user has been changed, the user is detected as a suspect based on it.

The operation 525 may include assigning weights of degree of risk to each of the behaviors during the process of identifying suspects to thereby calculate the degree of risk of the clusters having the pattern of particular behaviors. If the pattern of a user is changed, it is possible to determine wherein the user is a suspect taking into account the change in the degree of risk.

In addition, the operation 525 may include determining whether a user is a suspect based further on the department information. If the pattern of a particular person has been changed from a low-risk pattern to a high-risk pattern, she/he may be determined as a suspect. However, if the patterns of all the members of the department have been changed in the same way, she/he may not be determined as a suspect as it is likely that there is a change in the work of the department.

The concepts of the invention described above with reference to FIGS. 1 to 13 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims.

The exemplary embodiments should be considered in a descriptive sense only and not for purposes of limitation.

What is claimed is:

1. A method for detecting an anomaly based on behavior-analysis, the method comprising:
creating, by an apparatus for detecting an anomalous behavior of a user, K clusters, each cluster of the K clusters being created based on past behavior counters associated with one or more users;
designating, by the apparatus, a cluster pattern of the each cluster of the K clusters, the cluster pattern indicating a representative behavior of the past behavior counters belonging to the each cluster;
determining, by the apparatus, a past behavior pattern of a first user based on first past behavior counters associated with the first user and the each cluster of the K clusters;
obtaining, by the apparatus, first current behavior counters associated with the first user based on monitoring information from an agent software program, the agent software program being installed on a computing device of the first user and monitoring behaviors associated with the first user;
determining, by the apparatus, a current behavior pattern of the first user based on the first current behavior counters and the each cluster of the K clusters; and
detecting, by the apparatus, the anomalous behavior of the first user by comparing the past behavior pattern and the current behavior pattern of the first user,
wherein the designating the cluster pattern comprises:
extracting a center vector of the each cluster of the K clusters by using values of the past behavior counters belonging to respective clusters;
calculating a mean value and a standard deviation of coordinates of the center vector for the each cluster of the K clusters;
setting a threshold value for the each cluster of the K clusters by using the mean value and the standard deviation; and
selecting a behavior corresponding to coordinates exceeding the threshold value among the coordinates of the center vector as the cluster pattern of the each cluster of the K clusters.

2. The method of claim 1, wherein the first past behavior counters are obtained by counting a number of times that the first user has performed each of behaviors within a certain period of time in a past.

3. The method of claim 1, wherein the first current behavior counters are obtained by counting a number of times that the first user has performed each of behaviors within a certain period of time in an immediate past.

4. The method of claim 1, wherein the past behavior pattern is determined based on a first similarity between the first past behavior counter and the each cluster of the K clusters, and
wherein the current behavior pattern is determined based on a second similarity between the first current behavior counters and the each cluster of the K clusters.

5. The method of claim 1, wherein the creating the K clusters comprises:
collecting the past behavior counters and current behavior counters associated with the one or more users; and
preprocessing the past behavior counters and the current behavior counters associated with the one or more users so that values obtained by counting each behavior of behaviors corresponding to the past behavior counters and the current behavior counters associated with the one or more users have a same range.

6. The method of claim 5, wherein the preprocessing comprises removing noise from the past behavior counters and the current behavior counters associated with the one or more users by rounding the past behavior counters and the current behavior counters associated with the one or more users to a predetermined number of digits.

7. The method of claim 1 further comprises adding a new cluster pattern indicating a new representative behavior aside from representative behaviors belonging to the designated cluster pattern.

8. The method of claim 1, wherein the extracting the center vector of the each cluster comprises creating the center vector by averaging the values of the past behavior counters belonging to the respective clusters for each behavior of behaviors and transforming the values into the coordinates of the center vector.

9. The method of claim 1, wherein the threshold value is calculated by using a formula:

$$\text{the mean value} + \text{the standard deviation} \times n,$$

wherein n is a natural number.

10. The method of claim 1, wherein the selecting the behavior comprises:
classifying ordinary clusters, which have no coordinates exceeding the threshold value among the coordinates of the center vector; and
calculating a ratio of a number of the ordinary clusters to a number of the K clusters.

11. The method of claim 10 further comprises:
repeating calculating the ratio by varying a K value of the K clusters from 1 to a number of the one or more users; and
determining the K value between 1 and the number of the one or more users based on an Elbow method.

12. The method of claim 1, wherein the anomalous behavior of the first user is detected by using a degree of risk of the past behavior pattern and a degree of risk of the current behavior pattern when the past behavior pattern of the first user is different from the current behavior pattern of the first user.

13. The method of claim 12, wherein the detecting the anomalous behavior of the first user comprises calculating a degree of risk of the cluster pattern by applying a predetermined weight to a degree of risk for the behaviors.

14. The method of claim 12, wherein the anomalous behavior of the first user is detected further by using a change in patterns of members of a group to which the first user belongs.

15. The method of claim 1, wherein the past behavior counters correspond to behaviors comprising at least two of opening, creating, attaching, editing, deleting, moving, copying, printing, saving, and changing permission, and
wherein the anomalous behavior of the first user is leaking information.

16. An apparatus for detecting an anomalous behavior of a user based on behavior-analysis, the apparatus comprising:
at least one processor;
a network interface;
a memory configured to load a computer program; and
storage configured to store the computer program which, when executed by the at least one processor, causes the at least one processor to perform operations comprising:

creating K clusters, each cluster of the K clusters being created based on past behavior counters associated with one or more users;
designating a cluster pattern of the each cluster of the K clusters, the cluster pattern indicating a representative behavior of the past behavior counters belonging to the each cluster;
determining a past behavior pattern of a first user based on a first past behavior counter associated with the first user and the each cluster of the K clusters;
obtaining first current behavior counters associated with the first user based on monitoring information from an agent software program installed on a computing device of the first user;
determining a current behavior pattern of the first user based on the first current behavior counters and the each cluster of the K clusters; and
detecting the anomalous behavior of the first user by comparing the past behavior pattern and the current behavior pattern of the first user,
wherein the designating the cluster pattern comprises:
extracting a center vector of the each cluster of the K clusters by using values of the past behavior counters belonging to respective clusters;
calculating a mean value and a standard deviation of coordinates of the center vector for the each cluster of the K clusters;
setting a threshold value for the each cluster of the K clusters by using the mean value and the standard deviation; and
selecting a behavior corresponding to coordinates exceeding the threshold value among the coordinates of the center vector as the cluster pattern of the each cluster of the K clusters.

17. A non-transitory computer-readable storage medium storing instructions which, when executed by a processor, cause the processor to perform operations comprising:

creating K clusters, each cluster of the K clusters being created based on past behavior counters associated with one or more users;
designating a cluster pattern of the each cluster of the K clusters, the cluster pattern indicating a representative behavior of the past behavior counters belonging to the each cluster;
determining a past behavior pattern of a first user based on a first past behavior counter associated with the first user and the each cluster of the K clusters;
obtaining first current behavior counters associated with the first user based on monitoring information from an agent software program installed on a computing device of the first user;
determining a current behavior pattern of the first user based on the first current behavior counters associated with the first user and the each cluster of the K clusters; and
detecting an anomalous behavior of the first user by comparing the past behavior pattern and the current behavior pattern of the first user,
wherein the designating the cluster pattern comprises:
extracting a center vector of the each cluster of the K clusters by using values of the past behavior counters belonging to respective clusters;
calculating a mean value and a standard deviation of coordinates of the center vector for the each cluster of the K clusters;
setting a threshold value for the each cluster of the K clusters by using the mean value and the standard deviation; and
selecting a behavior corresponding to coordinates exceeding the threshold value among the coordinates of the center vector as the cluster pattern of the each cluster of the K clusters.

* * * * *